Figure 1:
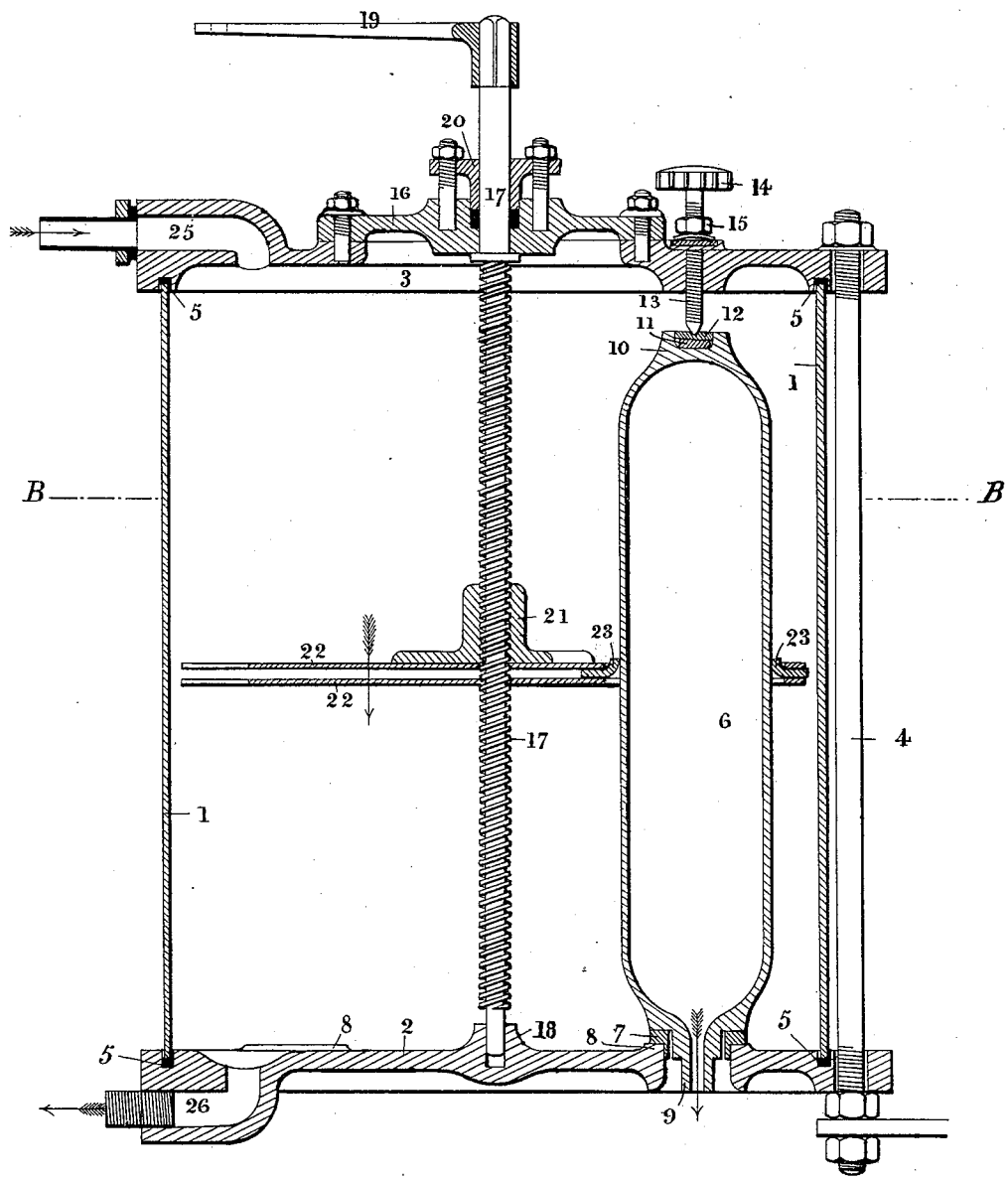

(No Model.) 2 Sheets—Sheet 1.

C. E. CHAMBERLAND.
FILTER.

No. 336,089. Patented Feb. 16, 1886.

Witnesses:
A. Le Canu
D. H. Brandon

Inventor
Charles Edouard Chamberland
by Brandon & Sons
Attorneys

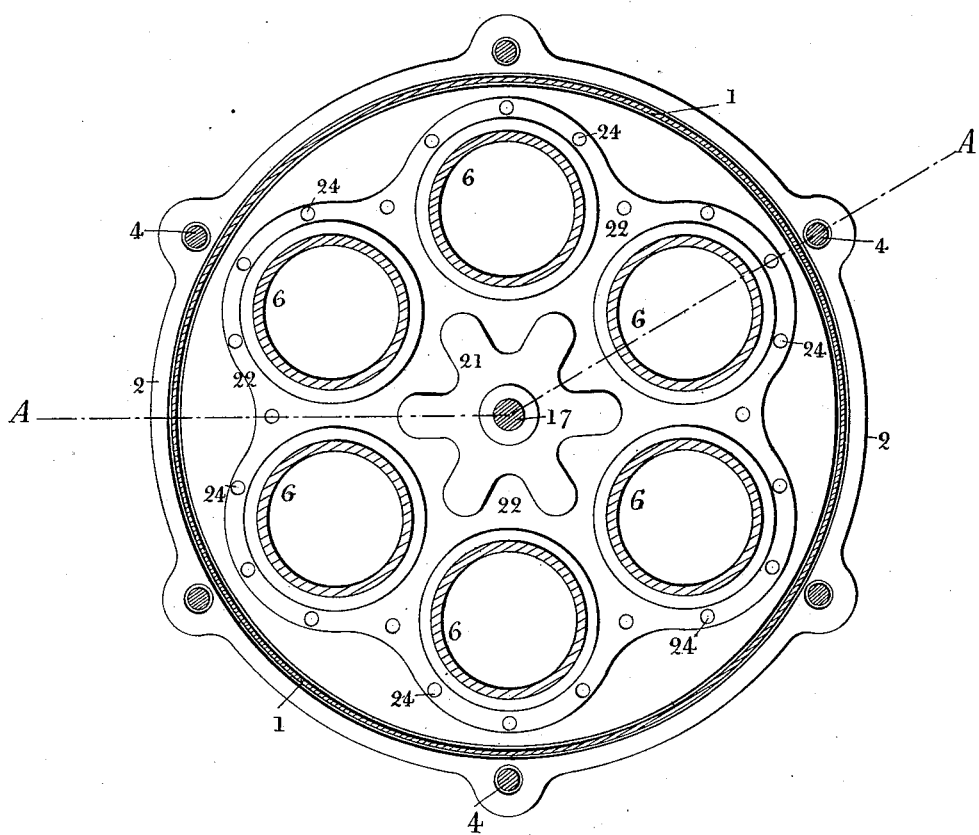

UNITED STATES PATENT OFFICE.

CHARLES EDOUARD CHAMBERLAND, OF PARIS, FRANCE.

FILTER.

SPECIFICATION forming part of Letters Patent No. 336,089, dated February 16, 1886.

Application filed June 15, 1885. Serial No. 168,680. (No model.) Patented in France May 15, 1885, No. 168,917; in Germany May 24, 1885, No. 34,056; in England June 2, 1885, No. 6,646, and in Belgium June 2, 1885, No. 67,095.

*To all whom it may concern:*

Be it known that I, CHARLES EDOUARD CHAMBERLAND, a citizen of the Republic of France, residing in Paris, France, have invented new and useful Improvements in Filters; and I do hereby declare that the following is a full, clear, and exact description of the same.

I have filed an application for Letters Patent, dated May 11, 1885, Serial of 1880 No. 165,054, for improvements embodying a filtering medium which retains all solid matter, including microbes and their germs, contained in water or other liquid. Owing to the efficiency of the said filtering medium the latter clogs relatively rapidly, on account of the deposit of solid matter on the outer surface of the filtering medium, hence the necessity of cleansing frequently; and if a certain number of filtering-bodies be grouped within the same space, and if a certain number of such groups be set up in batteries, any desired quantity of potable water can be obtained for the supply of schools, barracks, cities, armies, &c., or any liquid freed from any solid or organic matter, provided the rendering capacity of the filtering bodies is considered as a constant one; but this is not the case.

In filtering very impure water, wine, beer, and such like, the decrease of the rendering capacity of the filtering-bodies is rapid. The filtering operation then requires to be stopped, the apparatus has to be taken apart, and the filtering-bodies have to be taken out, cleansed, and refitted, whereby loss of time, expense, risk of breakage and leakage are entailed.

I have devised a cleansing apparatus which acts by causing a cleansing material to rub against and along the obliterated external surface of the filtering-bodies when clogged, so as to remove mechanically the adhering substances from the said surfaces. The same is operated from the outside without in any way stopping the filtering action.

Figure 1 is an elevation of an apparatus embodying my invention in section through A A, Fig. 2. Fig. 2 is a plan of the same in section through B B, Fig. 1.

The apparatus comprises a cylinder, 1, closed at its lower end by a bottom, 2, and at its upper end by a head, 3, both being connected by bolts 4, and the requisite tightness being secured by packing 5 5, let into grooves of 2 and 3.

6 6 6 6 6 6 are filtering-bodies, of any desired shape in cross-section, forming a battery. Each battery may be composed of any number of such bodies, and each body is manufactured from the filtering compound referred to in my application dated May 11, 1885, or any other filtering medium may be used. Each body 6 is made at its lower portion with an offset, which bears against an elastic washer, 7, laid upon a raised portion, 8, cast upon the bottom 2. Furthermore, it has a nozzle, 9, by which the filtered liquid may escape. At its upper end the body is thickened, forming a projection, 10, which is provided with a recess for the reception of an elastic disk, &c., upon which presses a metal disk, 12.

13 is a screw operated from the outside by a milled head, 14, for exerting pressure upon the filtering-body 6, in order to maintain the same firmly in place.

15 is a lock-nut for 13.

In the head 3 is a man-hole closed by a plate, 16. The center of the said plate acts as a bearing for an operating-screw, 17, the lower end of which rests in a step, 18, and the upper end of which is provided with a handle or crank, 19. The requisite tightness is obtained by a stuffing-box, 20.

Upon the operating-screw 17 is a nut, 21, to which are secured two plates, 22 22, for holding the cleansing substance. The latter is formed of washers or pieces 23, of thin metal, soft rubber, asbestus, textile or spongy material, or such like gripped between the two plates 22 22 by means of screws, rivets, or pins 24 at the edges of said plates.

Operation: In the normal condition the wine or other liquid to be filtered enters, under pressure or not, into the apparatus by an inlet-nozzle, 25, fills the apparatus, oozes through the filtering-bodies 6, which retain any impurities on their outer surface, and it then escapes by the nozzle 9, where it is collected.

*Cleansing the filtering-bodies.*—When, after a certain time, a layer of foreign matter has formed upon the outer surface of the filtering-bodies, whereby the filtering capacity is decreased, the cleansing operation is resorted to without stopping the filtering operation by turning the handle 19 one way or the other to cause the cleansing device to be raised or to be lowered. The solid or mucilaginous matter removed by the cleansing device is then in suspense in the liquid contained in the apparatus. The liquid charged with said impurities is run off by opening the discharge-pipe 26.

*Cleansing the apparatus.*—After a certain number of the last-named operations, it is desirable to cleanse the apparatus. To this end the inlet of the liquid to be filtered is cut off, a petcock or other suitable air-cock (not shown in the drawings) is opened, the filtering-bodies are cleansed, as hereinbefore described, the contents of the apparatus are run off by the outlet 26, and the apparatus is cleansed by causing a rush of water to enter therein and carry off all impurities which may have collected on the sides or on the bottom of the apparatus. When this operation is completed, the filtering operation is started afresh.

In cases where a number of apparatus herein described are set up or grouped in batteries, they may be so connected together as to be operated collectively by any suitable mechanical contrivance.

I claim—

1. A filtering-body, 6, having an offset at its lower portion for bearing against an elastic washer, 7, and having a projection, 10, at its upper portion, for forming therein a recess which receives one or more disks, substantially as described and illustrated, and for the purpose set forth.

2. A filtering-body, 6, having an offset at its lower portion, for bearing against an elastic washer, 7, resting on a raised portion, 8, of a plate, 2, and having a projection, 10, at its upper portion, for forming therein a recess which receives one or more disks, 11 12, in combination with a pressing-screw, 13, passing through a plate, 3, operated by a head, 14, and set by a check-nut, 15, substantially as described and shown.

3. A series of filtering-bodies, 6, arranged equidistantly in a circle, each with its projection 10, washers 11, 12, and 7, and pressing-screw 13, in combination with a central screw, 17, operated from the outside by a handle, 19, and having thereon a nut, 21, carrying disks 22 22, between which are held washers 23, acting as a cleansing medium against the outer surface of the said filtering-bodies 6, substantially as described and shown.

4. A cylinder, 1, closed by heads 2 3 and bolts 4, and having an inlet, 25, and an outlet, 26, in combination with a cleansing device comprising a central screw, 17, nut 21, disks 22 22, the said device acting, by means of a rubbing medium, 23, to cleanse a series of filtering-bodies, 6, substantially as described and shown.

5. The hereinbefore-described apparatus for filtering liquids and simultaneously cleansing the filtering-bodies of the same, consisting of a cylinder, 1, closed by ends 2 3, with packing 5 and bolts 4, a number of filtering-bodies, 6, an inlet, 25, for the liquid to be filtered, outlets 9 for the filtered liquid, an outlet, 26, for the discharge, as described, and a cleansing device comprising screw 17, crank 19, nut 21, disks or plates 22 22, and cleansing washers or material 23, substantially as described and shown.

In witness whereof I have hereunto set my hand, this 29th day of May, 1885, in presence of two subscribing witnesses.

CHARLES EDOUARD CHAMBERLAND.

Witnesses:
R. H. BRANDON,
A. LE CARM.